United States Patent [19]
Kopel

[11] Patent Number: 5,872,702
[45] Date of Patent: Feb. 16, 1999

[54] REMOTE CONTROL HOLDER

[76] Inventor: Philip S. Kopel, 28 Kennedy Rd., Sharon, Mass. 02067

[21] Appl. No.: 914,002

[22] Filed: Aug. 5, 1997

[51] Int. Cl.⁶ ..................................................... H05K 5/00
[52] U.S. Cl. .......................... 361/810; 361/807; 361/809; 361/679; 361/681; 211/13.1; 211/26.1; 211/163; 211/78; 211/131; 211/77; 248/671; 248/176.1; 248/205.2; 206/305; 206/320; 174/52.1; 174/52.4
[58] Field of Search ..................................... 361/810, 807, 361/809, 679, 680, 727, 730, 731; 211/13.1, 26.1, 163, 78, 131, 77; 248/671, 176.1, 205.2; 206/305, 320; 174/52.1, 52.4

[56] References Cited

U.S. PATENT DOCUMENTS

| | | | |
|---|---|---|---|
| 5,370,241 | 12/1994 | Silvers | 211/13 |
| 5,605,235 | 2/1997 | Johnson | 211/13 |
| 5,615,768 | 4/1997 | Schermerhorn | 206/305 |
| 5,758,972 | 6/1998 | Mack et al. | 383/11 |

*Primary Examiner*—Leo P. Picard
*Assistant Examiner*—David Foster
*Attorney, Agent, or Firm*—John P. McGonagle

[57] ABSTRACT

A remote control holder having a mounting face to which several remote control units are attached using releasable fastening strips. The mounting face terminates in a curved frontal section enabling the holder to be hung on a television or other piece of furniture when not in use. A label containing information, such as a channel guide, is attached to the mounting section undersurface. A clear acrylic window fits over the label and attaches flush onto the undersurface providing protection for the label.

9 Claims, 6 Drawing Sheets

REMOTE CONTROL HOLDER

BACKGROUND OF THE INVENTION

This invention relates to holders of accessories for electronic equipment, and in particular to a device for holding a plurality of remote control units for controlling electronic equipment, such as television receivers, VCR's, CD and DVD players, audio receivers, and the like.

Manufacturers of television sets, stereo receivers, VCR's, CD and DVD players, tape decks and other electronic entertainment equipment generally provide remote control units designed to operate the specific product the consumer purchased. Generally, most remote control units do not operate other manufacturer's products and often do not operate complementary products provided by the same manufacturer.

Typically, in order to solve this problem consumers purchase "universal remote controls" designed to learn the codes from existing remote control units. Given the additional functions continually added to the electronic devices, and given the need to keep the remote control units easy to use, many of the complex functions that the original equipment manufacturer's remote controls offer are not on these "universal remote control units".

A problem many consumers encounter with having several remote control units is the inability to organize the remote control units, and they become easily misplaced.

Often, several remote control units need to be operated at one time in order for a product to work. With the advent of "surround sound", consumers can use the Hi Fi stereo or surround sound VCR as the channel selector, and then send the sound through the stereo receiver or surround sound receiver to achieve "motion picture" sound quality. Also, many cable companies and satellite systems require the use of a special remote that operates their equipment. As a result, a consumer is required to use the TV remote, VCR remote, stereo remote and possibly a cable box remote in order to watch the television.

With the advent of cable television and satellite systems, the number of TV stations available to the consumer is approaching and in some cases exceeding 100 channels. Many of these channels have names such as Bravo, HBO, CNN, TBS, etc. As a result, consumers need to memorize the names of these channels and the corresponding channel locations on their system. Further, many local channels are located on channels different from what their airwaves channel numbers indicate.

SUMMARY OF THE INVENTION

The purpose of the present invention is to fasten together a plurality of remote control units supplied by manufacturers' of TV's, stereo receivers, VCR's, CD players, tape decks and other electronic entertainment devices so that they operate as one product. The present invention is nominally designed to simultaneously hold three, standard-width, remote control units. Other embodiments of the present invention may hold more or less remote control units. The present invention has a mounting face to which each remote control unit is centered. The remote control units are attached to the invention mounting face using fastening strips. The present invention enables a consumer to keep the remote control units together and operating together as a unit. The consumer is also able to easily take off an individual remote control unit to operate it alone or provide some repair such as replacing a battery. The mounting face terminates in a curved frontal section enabling the holder to be hung on a television or other piece of furniture when not in use. A label containing information, such as a channel guide, is attached to the mounting section undersurface. A clear acrylic window fits over the label and attaches flush onto the undersurface providing protection for the label.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

DETAILED DESCRIPTION OF THE INVENTION

Figure 1:
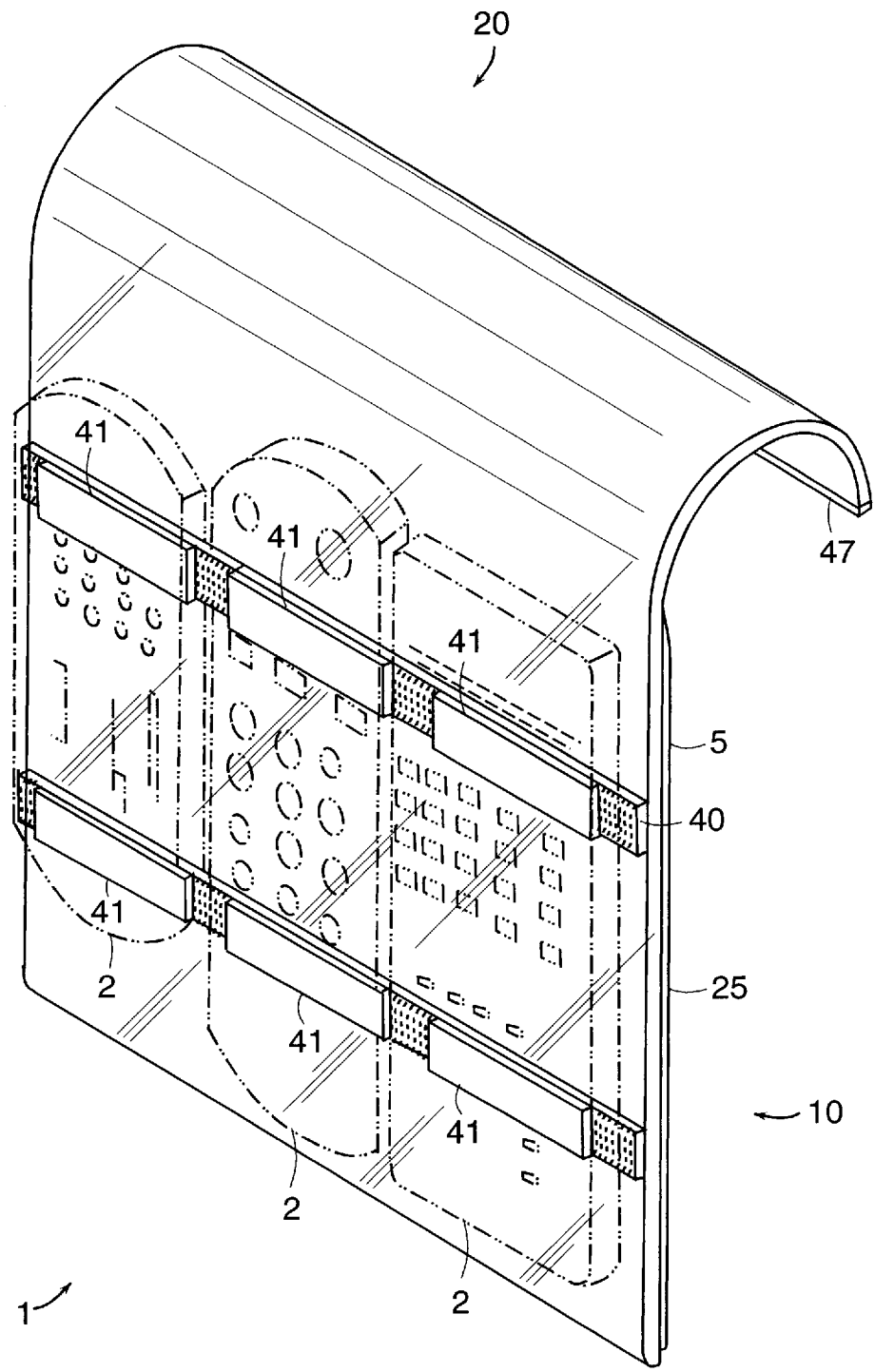
FIG. 1 is a side perspective view of the invention.
Figure 2:
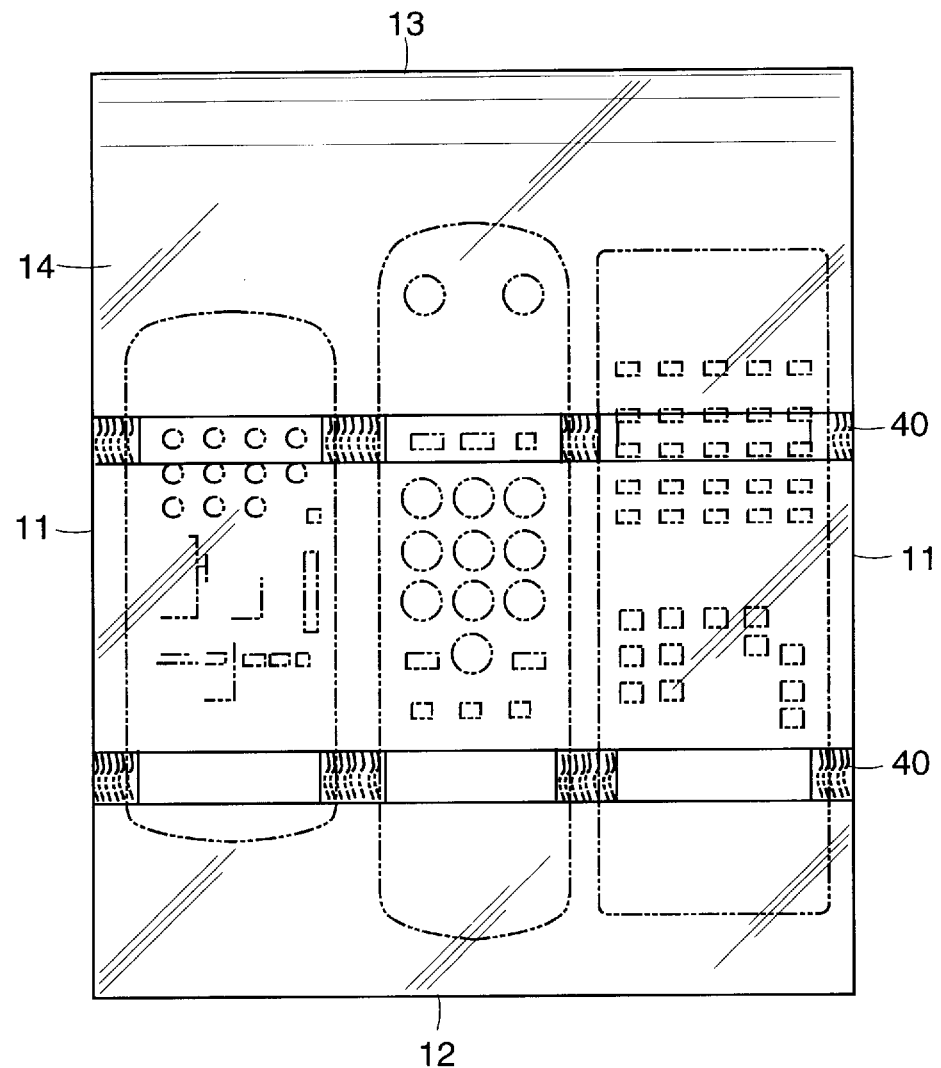
FIG. 2 is a top view thereof.
Figure 3:
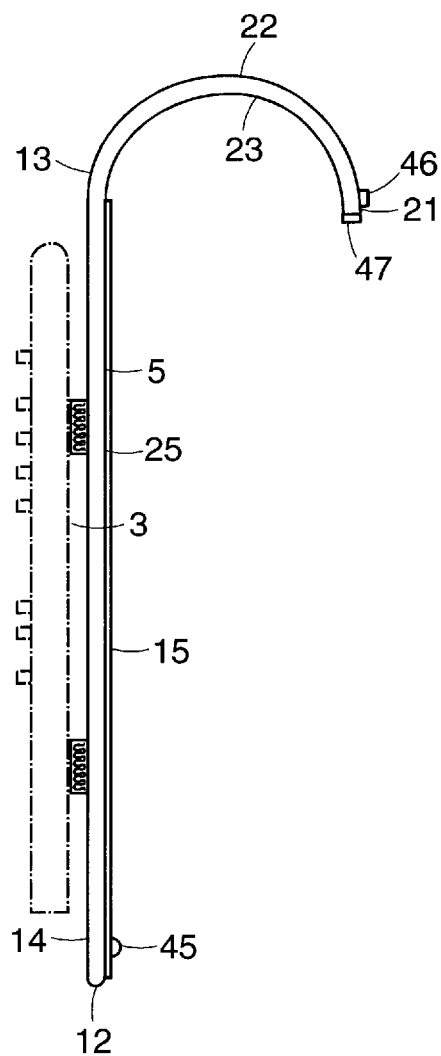
FIG. 3 is a side elevational view with the invention in a generally vertical orientation.
Figure 4:
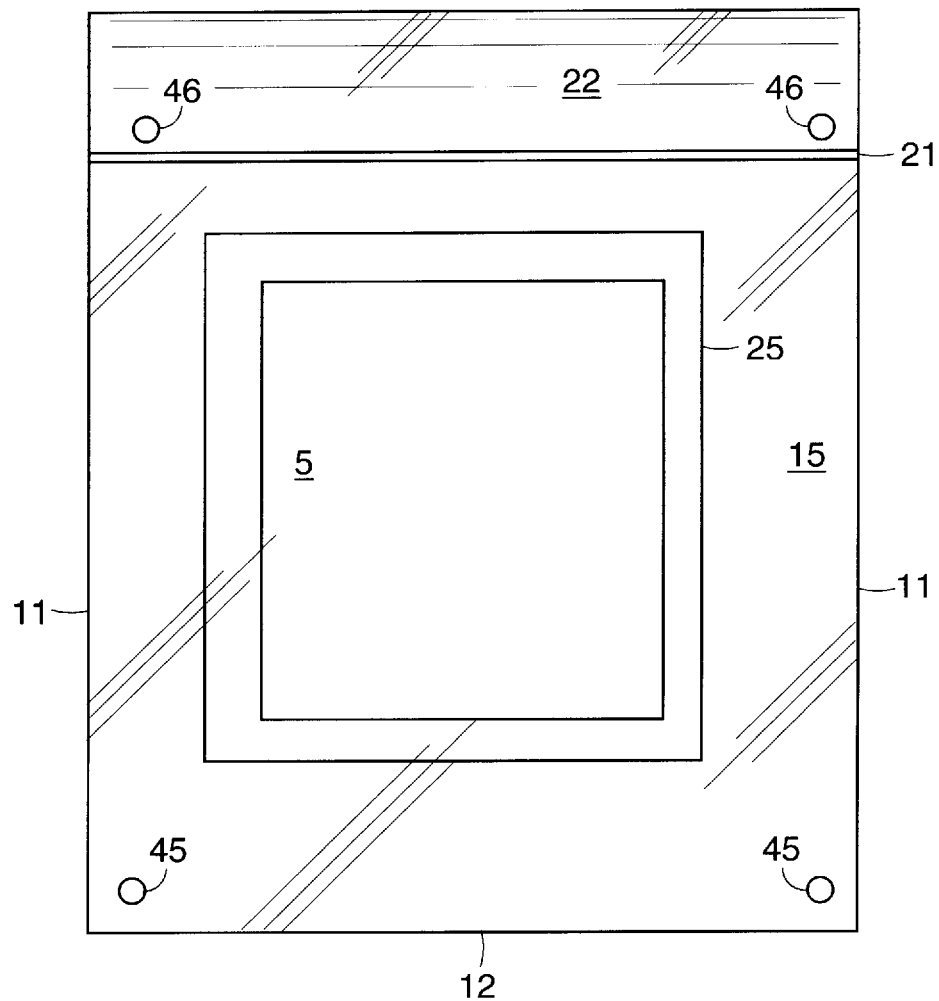
FIG. 4 is a bottom view thereof.
Figure 5:
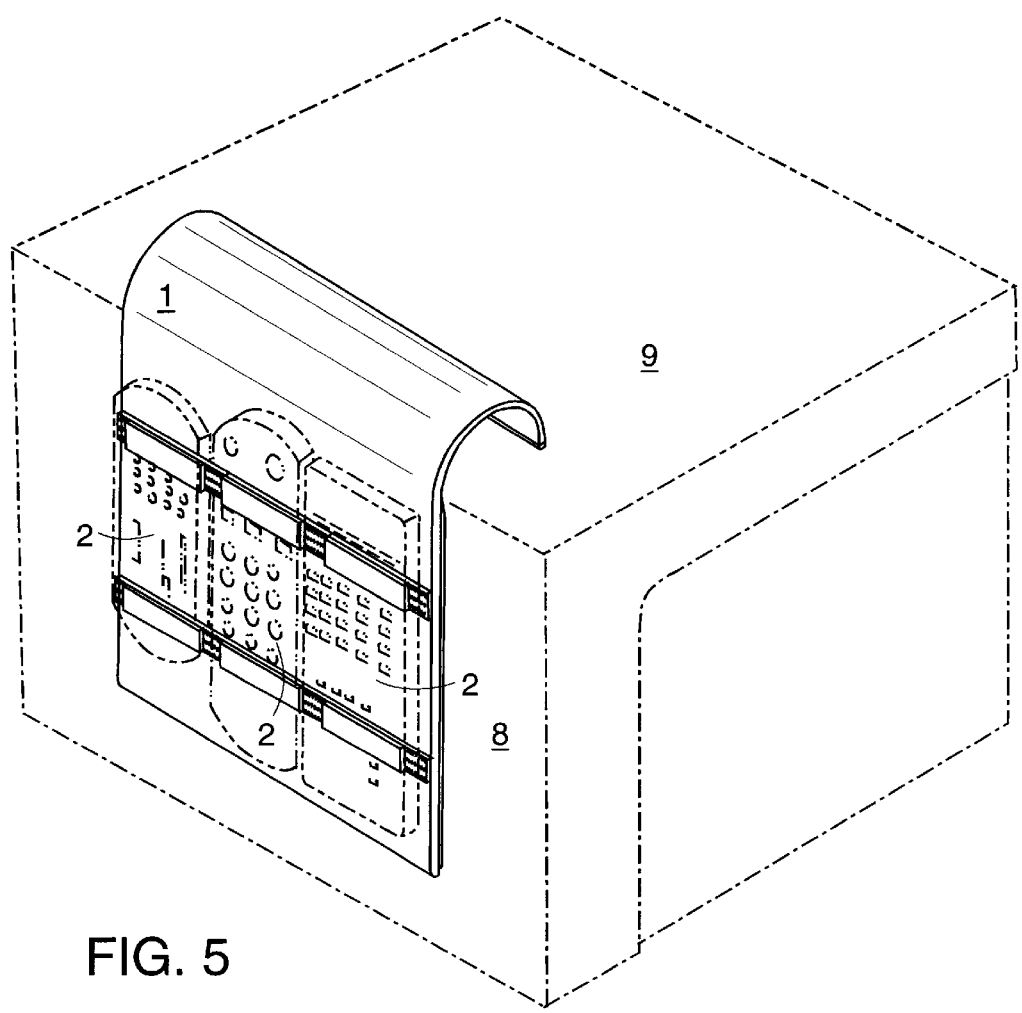
FIG. 5 is a perspective view of the invention in a generally vertical orientation engaging a television set.
Figure 6:
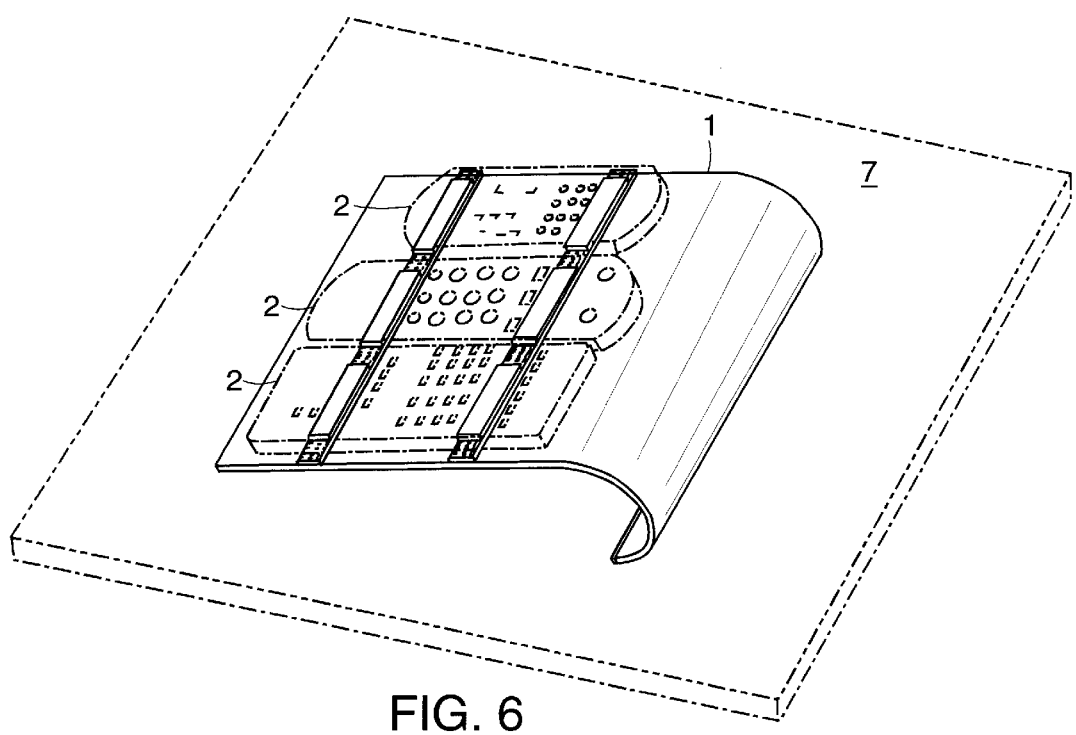
Fig. 6 is a perspective view of the invention resting on a table top.

Referring to the drawings in detail wherein like elements are indicated by like numerals, there is shown a remote control holder 1 constructed according to the principles of the present invention. The holder 1 has a mounting section 10 to which one or more remote control units 2 are centered and attached. In this embodiment of the invention, three remote control units 2 may be attached. The mounting section 10 has a generally rectangular shape with a rear side 12, an opposite forward side 13 terminating in a curved frontal piece 20, and two section sides 11 interconnecting said rear and opposite forward sides 12, 13, said section sides 11 being parallel to each other. The mounting section 10 has a mounting face 14 defined by the sides 11, 12 and 13, and an undersurface 15 opposite to the mounting face 14.

The curved frontal piece 20 has a half-cylinder shape with a cylindrical, central, longitudinal axis parallel to the mounting section forward side 13. The curved frontal piece has a longitudinal axis parallel to the mounting face front side 13. The cylindrical radial axis of the curved frontal piece 20 is perpendicular to the frontal piece longitudinal axis. The frontal piece 20 is curved toward the mounting section undersurface 15. The frontal piece 20 terminates in an unattached edge 21 radially opposite the mounting section opposite forward side 13. The frontal piece 20 has an outer surface 22 forming a smooth continuation of the mounting section mounting face 14. The frontal piece 20 also has an inner surface 23 forming a smooth continuation of the mounting section undersurface 15.

As stated above the remote control units 2 are attached to the invention mounting face 14 using fastening strips 40. Two fastening strips 40 are attached to the mounting face 14 in an arrangement parallel to the mounting section rear and forward sides 12, 13. The fastening strips 40 extend from one mounting section side 11 to the opposite side 11. The fastening strips 40 are equispaced along the longitudinal axis of the mounting face 14, said longitudinal axis being defined by the mounting face rear and forward sides 12, 13. Other spacing arrangements may be easily accomplished by a user. Two smaller sections 41 of fastening strip material are attached to each remote control unit undersurface 3. The fastening strip remote control sections 41 releasably mate with the holder fastening strips 40 when a remote control unit 2 is placed against the holder mounting face 14. The holder and remote control unit fastening strips 40, 41 may be made from polyolefin with acrylic adhesive, such as the SJ-3550 and SJ-3560 Dual Lock (TM) reclosable fasteners marketed by the 3M company. Any equivalent material, such as Velcro strips, may also be used.

To avoid scratching and sliding on furniture, the holder 1 has several bumpers. In this embodiment of the invention, two bumpers 45 are attached to the mounting section undersurface 15, positioned adjacent to the mounting section rear side 12 and each side edge 11. Two additional bumpers 46 are attached to the frontal piece outer surface 22, positioned adjacent to the unattached edge 21 and adjacent side edge 11. The unattached edge 21 is also encased in a custom-cut, rubber bumper 47.

The holder 1 may be made from a black acrylic or ABS plastic, an eighth of an inch thick, and having brushed and smooth edges. In this embodiment of the invention 1, the mounting section 10 is eight inches by eight inches square. A label 5 approximately five inches by seven inches, containing information, such as a channel guide, may be attached to the mounting section undersurface 15. A clear acrylic window 25 fits over the label 5 and attaches flush onto the undersurface 15 protecting the label 5 from dirt, liquid and other elements.

The present invention, when in use, is designed to sit on a generally horizontal surface 7, and rest at an angle on the curved frontal piece 20. Specifically, the mounting section rear side 12 and frontal piece unattached edge 21 engage the horizontal surface 7. The present invention, when not in use, is designed by virtue of the curved frontal piece 20 acting like a "hook" to lie flush up against the vertical surface 8 of a furniture piece or electronic piece of equipment, e.g., a television set, the curved frontal piece 20 of the invention engaging the top 9 of the furniture piece, holding the invention 1 in place.

It is understood that the above-described embodiment is merely illustrative of the application. Other embodiments may be readily devised by those skilled in the art which will embody the principles of the invention and fall within the spirit and scope thereof.

I claim:

1. A holder for a plurality of remote control units, comprising:

a mounting section having a generally rectangular shape with a rear side, an opposite forward side terminating in a curved frontal piece, and two section sides interconnecting said rear and opposite forward sides, said section sides being parallel to each other, said sides defining a mounting face to which said remote control units are releasably attached, and an opposite undersurface;

a plurality of fastening strips interconnecting said remote control units to said mounting face;

a label attached to the mounting section undersurface;

a transparent window fitted over said label and attached flush onto said undersurface.

2. A holder as recited in claim 1, wherein:

said curved frontal piece has a half-cylinder shape with a cylindrical, central, longitudinal axis parallel to the mounting section forward side, said curved frontal piece having a longitudinal axis parallel to the mounting face forward side, said curved frontal piece having cylindrical radial axis perpendicular to the frontal piece longitudinal axis, said frontal piece being curved toward the mounting section undersurface, said frontal piece terminates in an unattached edge radially opposite the mounting section opposite forward side, said frontal piece having an outer surface forming a smooth continuation of the mounting section mounting face, said frontal piece having an inner surface forming a smooth continuation of the mounting section undersurface.

3. A holder as recited in claim 2, wherein said fastening strips are comprised of:

a plurality of fastening strips attached to the mounting face in an arrangement parallel to the mounting section rear and forward sides, said fastening strips extending from one mounting section side to the opposite side, said fastening strips being equispaced along the longitudinal axis of the mounting face, said longitudinal axis being defined by the mounting face rear and forward sides; and two small fastening strip sections attached to each remote control unit, said fastening strip sections releasably mating with the fastening strips attached to said mounting face.

4. A holder as recited in claim 3, further comprising:

a plurality of bumpers attached to said mounting section undersurface adjacent to said mounting section rear side and attached to said frontal piece outer surface adjacent to said unattached edge.

5. A holder as recited in claim 4, further comprising:

a resilient material encasing said frontal piece unattached edge.

6. A holder as recited in claim 5, wherein said plurality of bumpers is comprised of:

two bumpers attached to the mounting section undersurface, adjacent to the mounting section rear side and each side edge;

two bumpers attached to the frontal piece outer surface, adjacent to the unattached edge and adjacent side edge.

7. A holder as recited in claim 6, wherein said fastening strips are comprised of:

polyolefin with acrylic adhesive.

8. A holder as recited in claim 7, wherein said mounting section is comprised of:

acrylic.

9. A holder as recited in claim 7, wherein said mounting section is comprised of:

ABS plastic.

* * * * *